Patented Jan. 14, 1930

1,743,533

UNITED STATES PATENT OFFICE

ARTHUR PATTISON DAVIS, OF BROOKLYN, NEW YORK

GYROSCOPE SUPPORTING AND CENTERING APPARATUS

Application filed July 1, 1927. Serial No. 202,771.

This invention relates to direction finders or compasses of the gyroscopic type, and more particularly concerns apparatus for supporting and centering the gyroscope unit of a gyroscopic direction finder.

When a gyroscope is employed as a compass or direction finder, its operation must be so controlled that the gyroscope will precess toward the meridian whenever the gyro axle is inclined to the meridian. This precession of the gyroscope is attained by suitably weighting the gyro unit in such a manner as to produce either a pendulous or top-heavy condition thereof, the moment created by such weight when the gyroaxle is inclined to the meridian producing the desired precession of the gyro. In order that the precession of the gyroscope may be a direct result of the pendulous or top-heavy weighting, and may be substantially unaffected by other forces, it is essential that the gyro supporting mechanism be so designed that turning moments and other forces created in this mechanism be reduced to an absolute minimum.

It is further essential to the proper operation of a gyroscopic direction indicator that the gyro supporting mechanism be arranged and designed to substantially eliminate the disturbing forces arising from the oscillations of the vehicle (such as a ship) on which the gyro is mounted or to prevent such forces from interfering with the accuracy of the indications.

With the above and other considerations in mind, it is proposed in accordance with the present invention to provide supporting and centering mechanism for the gyro unit of a gyroscopic compass, which mechanism is arranged to permit the free angular movement of this unit without the application of appreciable mechanical forces thereto. More specifically, it is an object of the present invention to support the gyro unit of a gyroscopic compass by floating this unit in a liquid, and to center the unit in the liquid container by means of a flexible filament which is attached to the unit in such a manner that turning moments and other forces on the unit, resulting from the angular movement thereof, are substantially eliminated.

Other specific objects, features and characteristics of the present invention will become apparent as the description thereof progresses.

In describing the invention in detail, reference will be made to the accompanying drawing, in which;

Figure 1 is a sectional side view of the essential elements of a gyro compass embodying the supporting and centering means of the present invention, certain of the parts being omitted and others being shown in a simplified and diagrammatic manner.

Fig. 2 is a sectional plan view of the gyro unit of the compass, taken along the line 2—2 of Fig. 1 and viewed in the direction of the arrows; and Fig. 3 is an enlarged sectional view of the means by which the centering filament is attached to the gyro unit.

For the purpose of illustration, the gyro unit supporting and centering means of the present invention has been shown applied to a single specific form of gyro compass, it being understood that this supporting and centering means is applicable to many forms of gyroscopic compasses and gyroscopes other than the specific form illustrated.

The gyroscopic compass illustrated includes a supporting frame 1 which is carried by two gimbal rings 2 and 3, these rings being connected by the trunnions 4, and the ring 3 being connected to the frame 1 by other trunnions, not shown, having their axes at right angles to the trunnions 4. The outer gimbal ring 2 is secured to suitable supporting means such as a binnacle 5 by a plurality of springs 6. A substantially spherical container 7 provided with axially aligned hollow hubs or cylindrical extensions 8 and 9, is positioned within the frame 1, the hubs 8 and 9 being carried in suitable antifriction bearings 10 and 11 respectively whereby the container 7 may turn about a vertical axis with respect to the frame 1. An inlet pipe 12 is provided in the upper hollow hub 9 for admitting liquid to the container, and an outlet pipe 13 is provided at the lower end of the lower hollow hub 8. A compass card 14 of conventional design is fixed to the upper hub 9 of the container 7, relative displacement between the unit G and the container 7 to the container. The means employed should preferably be of such a nature that the free movment of the gyro unit within the container 7 is not interfered with. In the embodiment shown, the follow-up means comprise a pair of radially disposed aligned electro-magnets or solenoids 32 and 33 horizontally secured within the float 16 near the center of the outer wall thereof as shown in Fig. 2. These solenoids are continuously energized by alternating currents, and act at times to induce currents in two coils 34 and 35 which are fixed to the outer surface of the container 7 and are symmetrically disposed with respect to a horizontal plane passing through the mid point of this container as shown in Fig. 1. As shown in Fig. 2, each of the coils 34 and 35 extends around less than one-half of the container 7 and thus two diametrally opposite openings are provided between these coils. When the float 16 is in the central position as shown in Fig. 2, the solenoids 32 and 33 are opposite the openings between the coils 34 and 35 and no currents are induced in these coils. When, however, the float 16 turns about its vertical axis, say in a clock-wise direction when viewed in Fig. 2, the magnetic flux from the solenoids 32 and 33 is traversed by and induces a current in the coils 34 and 35 respectively. If the float 16 turns in a counter clock-wise direction with respect to the container 7, current is induced in the coil 35 by the solenoid 32 and in the coil 34 by the solenoid 33. The coils 34 and 35 are connected through suitable amplifying means, not shown, to a control motor or other suitable operating mechanism located within the housing 36, this mechanism being connected to turn the container 7 about the gyro unit G. The currents energizing the coils 32 and 33 are displaced in phase relation or otherwise distinguished, and the driving means is so arranged and designed that when current is induced in the coil 34 by the solenoid 32 and in the coil 35 by the solenoid 33, the container 7 is turning in a clock-wise direction as viewed in Fig. 2; and, conversely, when current is induced in the coil 34 by the solenoid 33 and in the coil 35 by the solenoid 32, the container 7 is turned in a counter clock-wise direction.

The electric energy for driving the gyro motors and for energizing the solenoids 31 and 32 may be connected to the float 16 in any suitable manner. One convenient method of carrying these currents is illustrated, and comprises wires 37, disposed parallel to and adjacent the filament 20 and extending through insulating nipples 38 in the hubs 8 and 9 and through similar insulating nipples 39 in the wall of the float 16 within the central opening 17. The wires 37 are preferably held in proper relation to the filament 20 by a suitable flexible insulating sheath or covering 40, and the end connections between the wires and the insulating nipples 38 and 39 are coiled as shown to prevent the transmission of mechanical forces to the gyro unit therethrough. The sheath 40 may comprise a rubber coating into which the filament 20 and the wires 37 are vulcanized, or the wires may be individually insulated if desired. As the liquid employed is preferably distilled water, which is a non-conductor of electricity, careful insulation of the wires 37 is not essential. The sheath 40 has been shown broken away from the wires 37 and the filament 20 for a portion of the length thereof in Fig. 1. The wires 37 are connected through the nipples 38 to slip rings 41 carried by an insulating collar 42 and engaged by suitable brushes 43 which are mounted on the cage 1. The rings 41 and brushes 43 also serve to connect the coils 34 and 35 on the container 7 to the amplifying and driving means. The slip rings 41 and the brushes 43 have been illustrated at the upper hub 9 only, it being understood that a similar arrangement of current transmitting means is preferably employed at the lower hub 8, in order to avoid an excessive number of connections at the upper hub and to distribute the lead wires evenly along the entire filament.

From the description given it will be apparent that a very simple and efficient mechanism has been provided for supporting and centering the gyro unit of a gyroscopic direction finder or compass. The centering means is so designed and connected to the gyro unit that the unit is left substantially free to move, within certain limits, to any angular position about its center of flotation, and for this reason the application of undesirable forces and moments to the unit through the centering means, and consequent artificial precession of the gyros and inaccurate indication of the compass is avoided. The supporting means, being a liquid, obviously cannot impose turning moments upon the gyro unit, and as the unit is completely submerged in the liquid, no waves, ripples or other disturbances are set up in the liquid which might affect the smooth operation of the compass. Thus through the use of the combined supporting and centering means of the present invention, inaccuracies in the indications of a gyroscopic compass due to the various angular movements of the gyro unit relative to the container are largely eliminated.

In installations where positive buoyancy of the gyro unit G is preferred, the lower portion of the filament 20 below the clamping means 28—29 is under a slight tension, while the upper portion of the filament is under no tension. Conversely, if the gyro unit is floated in a state of negative buoyancy, tension is imparted to the upper portion of the filament while the lower portion is under no tension. A similar effect is also produced upon increase of the temperature of the liquid which is accompanied by a decrease in its buoyancy so that the tension on the lower portion of the filament is decreased. While the apparatus is initially designed with due regard to the possible temperature range to which it may be subjected, nevertheless the changes in density of the liquid accompanying its changes in temperature, produce the tension effects on the filament as described.

Although the supporting and centering means of the present invention have been described in a single specific form and in connection with a specific type of gyroscopic compass, it should be understood that various changes, modifications or omissions may be made in the arrangement and construction of the supporting and centering means and in the type of gyro compass in connection with which these means are employed without departing from the scope of the invention as defined in the appended claims.

I claim:

1. In a direction finder, a container filled with a liquid, a direction seeking unit, a float submerged in the liquid in said container and carrying said unit and means for fixing the position of said float in said container comprising a flexible filament secured in said container and secured to said float.

2. In a gyroscopic compass, a gyro unit, a container therefor, buoyant means in the container for supporting said unit therein, and a flexible tensioned filament fixed to said container and to said unit for centering said unit within said container.

3. In a gyroscopic compass, a container having a liquid therein, a float within said container supported by its buoyancy in said liquid, a gyroscope carried by said float, a flexible filament secured in said container and means for attaching said float to said filament.

4. In a gyroscopic compass, a container filled with a liquid, a buoyant member completely submerged in the liquid in said container and supported thereby, a gyroscope carried by said buoyant member, and a flexible filament secured in tension between a point on the wall of said container and a point on said float.

5. In a gyroscopic compass, a container having a liquid therein, a buoyant member in said container supported by said liquid, a gyroscope carried by said buoyant member, a filament extending vertically through said container and having its ends fixed thereto and means for connecting the center of flotation of said buoyant member to an intermediate point of said filament.

6. In a gyroscopic compass, a container having a liquid therein, a buoyant member in said container supported by said liquid, a gyroscope carried by said buoyant member, a flexible filament extending vertically through said container and having its ends fixed thereto, means for maintaining said filament under tension, and means for connecting the center of flotation of said buoyant member to an intermediate point of said filament.

7. In a gyroscopic compass, a container having a liquid therein, a float within said container supported by its buoyancy in said liquid, a gyroscope carried by said float, a flexible filament secured vertically between spaced points in said container, means for maintaining said filament under tension and friction means for attaching said float to an intermediate point of said filament.

8. In a gyroscopic compass, a container filled with a liquid, a vertical centrally disposed filament secured at its ends to spaced points within said container, a buoyant member submerged within the liquid in said container and surrounding said filament, a gyroscope carried by said member, and means for securing said member to a point on said filament.

9. In a gyroscopic compass, a container filled with a liquid, a vertical centrally disposed filament secured at its ends to spaced points within said container, a buoyant member submerged within the liquid in said container and surrounding said filament, a gyroscope carried by said member, and clamping means on said member for securing said member to said filament.

10. In a gyroscopic compass, a container filled with a liquid, a vertical centrally disposed flexible filament secured at its ends to spaced points within said container, means for maintaining said filament in tension, means for adjusting the tension of said filament in said container, a buoyant member submerged in said liquid in said container and surrounding said filament, a gyroscope carried by said member and means for securing said member to a point on said filament.

11. In a gyroscopic compass, a container filled with a liquid, a buoyant member submerged in the liquid in said container and having a vertical central opening therethrough, a gyroscope carried by said buoyant member, a filament secured between spaced points in said container and passing vertically through the opening in said member and means for securing said member to said filament at a point within the opening of said member.

12. In a gyroscopic compass, a container filled with a liquid, a hollow buoyant member submerged in the liquid in said container and having a vertical central opening therethrough, a gyroscope carried within said buoyant member, a filament secured between spaced points in said container and passing vertically through the opening in said member, and means for securing said member to said filament at a point within the opening within said member and substantially at the center of flotation of said member, said means including a friction device.

13. In a gyroscopic compass, a container filled with a liquid, a substantially spherical buoyant float submerged within the liquid in said container and having a vertical central opening therethrough, a gyroscope carried by said float, a flexible filament secured between spaced points in said container and passing vertically through the opening in said float and means for securing substantially the center point of said float to said filament, said means having opposite points of contact with the filament.

14. In a gyroscopic direction finder, a container journalled on a vertical axis and filled with a liquid, a filament secured between spaced points in said container and lying along the axis of rotation thereof, a buoyant member submerged in the liquid in said container and supported by its buoyancy in said liquid, a gyroscope carried by said member, means for securing said member to an intermediate point on said filament, and follow-up means for transmitting the turning motion of said buoyant member about the axis of rotation of said container to said container.

15. In a gyroscopic direction finder, a container journalled on a vertical axis and filled with a liquid, a flexible filament connected to a point in said container and lying along the axis of rotation thereof, a float submerged in the liquid in said container and supported in equilibrium at an intermediate point in said container by its buoyancy in said liquid, a gyroscope carried by said float, means for securing said float to said filament, and follow-up means for transmitting the turning motion of said float about the axis of rotation of said container to said container.

16. In a gyroscopic compass, a container filled with a liquid, a hollow substantially spherical float submerged in the liquid within said container and having a vertical central passage therethrough, a gyroscope carried within said float, said float being supported in equilibrium at an intermediate point in said container by its buoyancy in said liquid, a flexble filament secured between spaced points within said container and extending vertically through the central passage of said float, and means for clamping said float to said filament at substantially the center of flotation of said float.

In testimony whereof I affix my signature.

ARTHUR PATTISON DAVIS.

Jan. 14, 1930.    M. L. DODGE    1,743,534
COUNTER STIFFENER AND METHOD OF MAKING THE SAME
Filed June 16, 1923    2 Sheets-Sheet 1
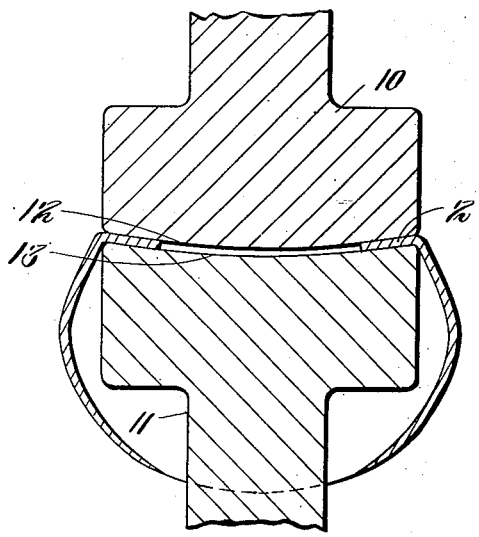
Fig. 1.
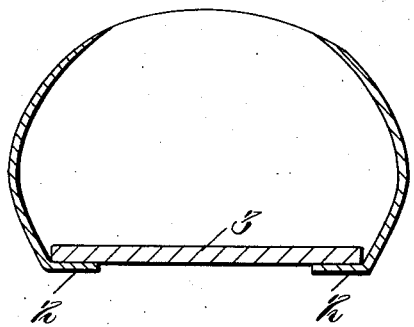
Fig. 3.
Fig. 2.
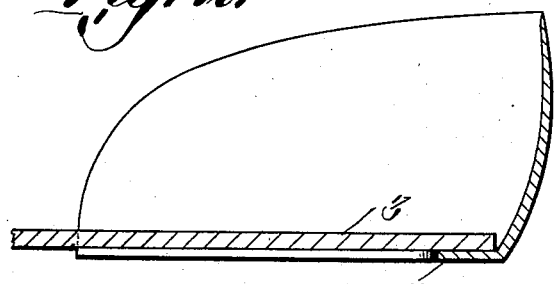
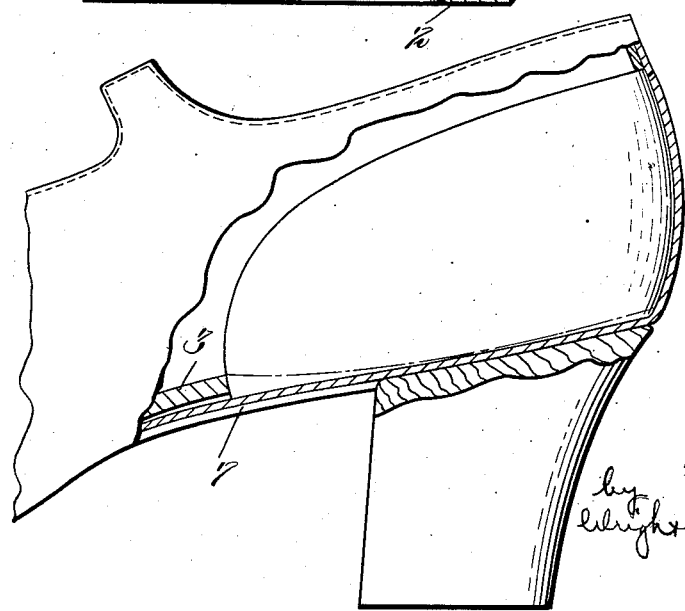
Fig. 4.
Inventor:
Milton L. Dodge,
by Wright Brown Quinby May
Attys.